(12) United States Patent
O'Keefe et al.

(10) Patent No.: US 12,302,460 B1
(45) Date of Patent: May 13, 2025

(54) SELF-LIMITING THICK FILM POSITIVE TEMPERATURE COEFFICIENT OF RESISTIVITY (PTCR) RESISTOR COMPOSITIONS

(71) Applicant: DATEC COATING CORPORATION, Mississauga (CA)

(72) Inventors: William Kevin O'Keefe, Georgetown (CA); Minh Hao Pham, Mississauga (CA); Abdullah Khalil, Mississauga (CA)

(73) Assignee: Datec Coating Technologies Ltd., Misissauga (CA)

( * ) Notice: Subject to any disclaimer, the term of this patent is extended or adjusted under 35 U.S.C. 154(b) by 0 days.

(21) Appl. No.: 18/812,384

(22) Filed: Aug. 22, 2024

(51) Int. Cl.
| | |
|---|---|
| H05B 3/14 | (2006.01) |
| C04B 35/468 | (2006.01) |
| C04B 35/64 | (2006.01) |
| H01C 7/00 | (2006.01) |
| H01C 7/02 | (2006.01) |

(52) U.S. Cl.
CPC ......... H05B 3/143 (2013.01); C04B 35/4682 (2013.01); C04B 35/64 (2013.01); H01C 7/003 (2013.01); H01C 7/025 (2013.01); H05B 2203/013 (2013.01); H05B 2203/017 (2013.01); H05B 2203/02 (2013.01); H05B 2214/04 (2013.01)

(58) Field of Classification Search
None
See application file for complete search history.

(56) References Cited

U.S. PATENT DOCUMENTS

2006/0138121 A1* 6/2006 Werkman ............... H05B 3/26
219/543

OTHER PUBLICATIONS

I. Zajc and M. Drofenik, J. Euro. Ceram. Soc., 1999, 19, 893. "Preparation of PTCR Ceramics in the BaO±Nb2O5±TiO2 System".
A.R. Rathmell et al. "Synthesis of Oxidation-Resistant Cupronickel nanowires for transparent conducting nanowire networks", Nano. Lett. 2012, 12(6), 3193.

* cited by examiner

*Primary Examiner* — John J Norton
*Assistant Examiner* — Theodore J Evangelista
(74) *Attorney, Agent, or Firm* — HILL & SCHUMACHER

(57) ABSTRACT

The present disclose provides a sol-gel paste composition of matter that is provided for application to a substrate to form an electrically conductive coating which can be used, for example, as a resistor in a thick-film resistive heater, which a positive temperature coefficient of resistivity (PTCR) as a consequence of the electronic properties of the electrically conductive semiconductors used in the resistor layer and which exhibits self-limiting behavior at elevated temperatures. The composition includes a sol gel solution in which up to 90% by weight (wt. %) of the solution is comprised of conductive and insulative powders in a uniform stable solution.

15 Claims, 5 Drawing Sheets

SELF-LIMITING THICK FILM POSITIVE TEMPERATURE COEFFICIENT OF RESISTIVITY (PTCR) RESISTOR COMPOSITIONS

FIELD

The present disclose pertains to sol-gel paste compositions of matter that when cured or fired exhibit a positive temperature coefficient of resistivity (PTCR) may be used in many different applications, for example when applied to a substrate can be used to form an electrically conductive coating which can be used, for example, as a resistor in a thick-film resistive heater.

BACKGROUND

The expressions "resistive" and "conductive" in association with coatings are herein used to refer to coatings which will pass electrical currents as opposed to those which are insulative. Whether a coating is deemed resistive or conductive depends on how freely it passes an electrical current. The expression "electrically conductive coating" is intended to include both resistive and conductive coatings.

Thick film resistive heaters involve the deposition of a one or more dielectric layers to provide electrical insulation of the substrate for the subsequent deposition of circuit elements including conductor and resistor traces. The resistivity of a thick film resistor may depend on temperature (R(T)) as outlined in Equation (1) where a is the Thermal Coefficient of Resistivity (TCR) which is typically reported with the unit ppm/K, where R(T) is the resistivity at some temperature T, $R(T_o)$ is the resistivity at a reference temperature $T_o$, which is typically 25° C. AT is the difference between T and $T_o$.

$$R(T)=R(T_o)(1+\alpha\Delta T) \quad (1)$$

Depending on the nature of the technology, the resistive layer may have a negative temperature coefficient of resistivity (NTCR) or a positive temperature coefficient of resistivity (PTCR) as a consequence of the electronic properties of the electrically conductive material used in the resistor layer. In the former case, as the temperature increases, the resistivity of the material decreases, resulting in an increase in electrical current at a constant voltage. In the latter case, the resistivity of the material increases with increasing temperature, resulting in a decrease in electrical current at a constant voltage. NTCR resistors therefore have the undesirable characteristic that as the temperature increases, runaway conditions and overheating may ensue as the circuit's resistance decreases with increasing temperature at constant voltage. In contrast, a PTCR resistor may have an inherent fail-safe characteristic in that as temperature increases, the resistance of the electric circuit also increases, limiting the current through circuit.

Thus, PTCR resistors are desirable from a product liability perspective and particularly for high temperature applications as they afford self-limiting behavior which assures intrinsic safe design. Depending on the physico-chemical mechanism responsible for the PTC effect, the resistor may have a linear PTC response, such is the case for which the conductive phase is $RuO_2$. In other cases, such as that for $BaTiO_3$ and some perovskite-based materials, the PTC effect may be highly non-linear, wherein the resistivity is relatively constant over a broad range of temperature, then increasing rapidly by several orders of magnitude due to a change in its electronic properties associated with a phase change associated with its crystal structure at the Curie Temperature. This rapid switching effect is desirable as a fail-safe feature in heaters, so that if the heater exceeded this critical temperature, the circuit would be effectively closed until it cools to a temperature below the Curie Temperature.

$BaTiO_3$ is commonly used as a PTCR material due to its low cost and successful use for many decades. However, its Curie temperature when doped is only around 120° C. which significantly limits its utility and precludes its application for heaters that must operate much higher than 120° C. $BaTiO_3$ may be doped with lead to substantially increase the Curie Temperature, however, lead is highly toxic and is a prohibited substance in products in many jurisdictions. The state-of-the-art, lead free PTCR materials with highly non-linear rapid switching temperature are based on solid solutions of barium titanate and bismuth alkaline titanates such as bismuth sodium titanate and bismuth potassium titanate. These solid solutions are typically doped with alkali earth and or rare earth elements and or group V transition metals [1-10]. The Curie temperature of bismuth alkaline titanates is typically less than 260° C., which limits the application of this class of PTCR material to temperatures below ca 250° C. These materials are reported to often exhibit high room temperature resistivity and often unacceptable TCR behavior prior to the Curie temperature.

Significantly, bismuth alkaline titanates exhibit poor resistor stability due to intrinsic defects created during their synthesis, as a result of evaporative loss of Bi and other elements during high temperature sintering. These intrinsic defects which manifest in the form of cation vacancies will facilitate the electromigration of small cations when the material is subjected to the application of electromotive force, thereby causing permanent changes to their resistivity, precluding their use in applications where strict tolerances of the resistor stability are required.

Zajc and Drofenik [11] describe a PTCR effect in the $BaO$—$Nb_2O_5$—$TiO_2$ system and teach that when $BaNb_2O_6$ is doped with up to 2 wt. % $TiO_2$ and sintered in the presence of hydrogen, the resultant material is a very conductive ceramic which is comprised of a titanium rich phase ($Ba_{1-x}Ti_xNb_2O_{6+x}$ where x=0.12) responsible for the conductivity and a $BaNb_{1.66}O_{5.2}$ phase. This reduced material does not exhibit a PTCR effect. However, when this material is carefully re-oxidized in a controlled manner, a material can be created for which a PTCR effect can be observed when the material is heated to about 300° C., however, the room temperature resistivity is very high when oxidized, and the TCR behavior prior to the Curie temperature is undesirable, precluding this material as being useful for as an active agent for an intrinsic PTCR material for thick film heaters.

P. S. V. S. Rao and K. S. Rao [16] described the synthesis of dysprosium (Dy) doped barium and sodium niobate ceramics reporting PTCR effects with Curie temperatures ranging from 147 to 415° C. depending on the Dy concentration in the material, due to a transition from ferroelectric to paraelectric phases. Although materials with a slight PTC effect can be created following the protocol of Rao and Rao the materials exhibit very high resistivity precluding their possibility for use as a PTC resistor material in a thick film heater.

Chinese patent CN2321259 [17] described "warm keeping shoes" created using ceramic heating sheets comprised of mixtures of barium strontium niobate and barium strontium titanate. The heater could operate with resistances ranging from 15 to 25Ω, from applied voltages ranging from 3 to 24 V DC. However, the Curie temperature is very low, ranging from 30 to 80° C., precluding this material from being useful in a high temperature resistive heater. Similarly, Chinese patent CN 2284508Y [18] describes a low voltage electronic mosquito repellant incense apparatus comprise of a low voltage (less than 24 V and less than 500 mA) PTC heater, wherein the PTCR resistive material is comprised of a barium strontium titanate and strontium barium niobate. The Curie temperature for this material is higher, 180 C to 200° C. However, the TCR before transition for these materials are known to be not sufficiently flat to ensure consistent power draw during operation in a high voltage heater. Further, the low Curie temperature limits the applicability of the technology to temperatures below about 160 to 180° C.

Allston et al. [13] describe a vaporizer that includes a PTCR heating element, wherein the PTCR material found in one or more of the conductive layers may or may not include an alkali niobate from the group Li, Na, K or Rb niobates. Allston et al. suggest the use of $PbTiO_3$ as a PTCR material, which is undesirable due to the toxicity of lead. Moreover, the PTC material is pressed directly into a disk, which limit how it can be processed.

To overcome the above-noted drawbacks, it is of great utility to be able to integrate PTCR characteristic to a screen printable or sprayable thick film sol-gel paste. Furthermore, it is desirable to have a lead-free thick film resistor containing one or more PTCR materials resulting in a much higher Curie temperature than that afforded by Pb doped $BaTiO_3$ for example, which has a Curie temperature around 120° C., in order to enable higher temperature operation of thick film heaters. It is also desirable to provide a resistor with very stable and repeatable TCR behavior with significant positive TCR effect to ensure consistent power draw in heaters and to provide inherent over temperature protection. It is also important that the resistor exhibits resistance to the effects of humidity. Furthermore, it is desirable to produce a PTCR resistor comprised of ingredients which are relatively inexpensive and non-toxic.

SUMMARY

The present disclosure addresses one or more of the aforementioned deficiencies in prior art. For example, the inventors have been able to successfully integrate a PTCR material into a sol-gel formulation in a manner which overcomes the increased resistivity due to increased contact resistance arising from the comminution of the milled powders, while simultaneously ensuring good adhesion and cohesion of the film. To the best of the inventor's knowledge, this has not been successfully done to date.

The present inventors have discovered that when such a PTCR material was sintered in a reducing environment rather than in air, and without the use of Dy as a dopant (such as used in Rao and K. S. Rao [16]), highly conductive materials can be made, which exhibit a similar "light off behaviour" as the inventors observed with $BaNb_2O_6$-based PTCR materials disclosed hereinafter.

A composition of matter is provided for application to a substrate to form an electrically conductive coating which can be used as a resistor in a thick-film resistive heater, which exhibits self-limiting behavior at elevated temperatures. The composition includes a sol gel solution in which up to 90% by weight (wt. %) of the solution is comprised of conductive and insulative powders in a uniform stable solution. The conductive and insulative particles typically range from 1 to 100 μm but more preferably 2 to 20 μm in size. The conductive particles are comprised of a semiconductor material that has been first decorated with conductive metallic particles. The decorated semiconductor particles are subsequently combined with a conductive nanomaterial, preferably conductive nano-wires and are introduced into the sol-gel solution to form a stable dispersion. Additional processing aids may be added to the solution to achieve the desired viscosity and stability to enable screen printability and to ensure stability during long term storage.

A nanorod is a nanostructured material with an aspect ratio (length to diameter ratio) typically ranging from 3 to 5 while a nanowire has a substantially higher aspect ratio of about 1000 or more. For the purpose of this disclosure, we refer to a nano-rod as a nanostructured material having an aspect ratio of greater than 1 but less than 1000, while a nanowire will have an aspect ratio greater than or equal to 1000.

The insulative materials are powders comprised of ceramic materials that can be introduced to control the resistivity of the conductive film, by increasing the sheet resistance as required. These materials include but are not limited to candidates such as, but not limited to, alumina, silica, titania, zirconia, niobium oxide, silicon carbine, iron oxide, samarium oxide, aluminum nitride, silicon nitride and boron nitride.

The semiconductor particles are comprised of a solid solution of two or more metal oxides that may exhibit either perovskite or tungsten-bronze crystal structure. The semiconductor particles can be doped with alkali earth metals, lanthanum, transition metals, or other dopants to modify the electronic properties of the semiconductor.

The metallic particles, which are used to decorate the semiconductor, are one or more of a transition metal or conductive metal oxides. Especially useful metallic particles are either resistant to oxidation or remain substantially conductive after passivation including {Ag, Cu, Ni, Au, Pd, Pt, Rh, Ru, Ir}. Metal oxides may include one or more of the following (ruthenium oxide, indium tin oxide (ITO); rhodium oxide). These metallic or metal oxide particles are typically <5 μm in characteristic dimension and more preferably are nanostructured with at least one dimension <100 nm.

The nanomaterial is a nanowire or nanorod that may be at least one of a single wall carbon nanotube, a multi-wall carbon nanotube, a metallic nanowire or nanorod, a metallic nanowire or nanorod that has been decorated by one or more of a second kind of metal, a silicon-based nanowire or nanorod, or a nanowire or nanorod comprised of a conductive polymer. The nanomaterial should exhibit good thermal stability and resistance to oxidation at the intended operation temperature.

The sol-gel solution, to which the insulative and conductive powders are added, may be any one or combination of aluminates, silicates, titanates, zirconates, niobates, alumina, silica, titania, zirconia, niobium oxide or combinations thereof.

In a first aspect, the present disclosure provides a thick film heating device, comprising:
  a) a substrate;
  b) at least one dielectric coating located directly on said substrate;
  c) an electrically conducting resistive inorganic sol gel coating located directly on said dielectric coating, said inorganic sol gel coating having disbursed throughout the sol gel coating
    doped semiconductor particles of at least one type, said doped semiconductor particles of at least one type having either a perovskite crystal structure or a tungsten-bronze crystal structure and exhibiting a positive thermal coefficient of resistivity above a threshold switching temperature, and conductive nanowires or conductive nanorods, or both, to facilitate electrical conduction between said at least one type of semiconductive particles through said electrically conducting resistive inorganic sol gel coating; and d) at least two electrical conductor strips located along a peripheral edge of said electrically conducting resistive inorganic sol gel coating, either directly on the inorganic sol gel coating or between the peripheral edge of the inorganic sol gel coating and a peripheral edge of the dielectric coating, the least two electrical conductor strips being connectable to a power supply for providing electrical power to said electrically conducting resistive inorganic sol gel coating.

In this first aspect the thick film heating device may further comprise the doped semiconductor particles of at least one type having conductive particles bound to an outer surface of said one or more types of doped semiconductor particles.

In this first aspect the doped semiconductor particles of at least one type may have a perovskite crystal structure and are selected from the group consisting of $BaTiO_3$, $KNbO_3$, $SrTiO_3$, $CaTeO_3$, $SrTeO_3$, $BaTeO_3$, $SrNbO_3$, $KNaNbO_3$ and combinations thereof.

In this first aspect the doped semiconductor particles of at least one type may have a tungsten-bronze crystal structure and are any one of $BaNb_2O_6$, $Sr_2KNb_5O_{15}$, $Ba_4Na_2Nb_{10}O_{20}$ and combinations thereof. These doped semiconductor particles are combined with $TiO_2$ powder and sintered in a reducing environment at a temperature in a range from about 900° C. to about 1450° C., or from about 1200° C. to about 1375° C., to produce electrically conductive phases within the sintered semiconductor powder formulation.

In this first aspect the conductive nanorods or conductive nanowires, or both, may be comprised of one or more of Ag, Cu, Ni, Au, Al, Fe, Pd, Pt, Si, $TiO_2$, ZnO, $RuO_2$, indium-tin oxide (ITO). They may also be Cu—Ni nanorods and/or nanowires with a core-shell structure comprised of a copper nanowire or nanorod onto which one or more atomic layers of nickel has been deposited, and wherein a mass fraction of the Cu—Ni nanorods to the doped semiconductor particles in the semiconductor powder ranges from about 10 wt. % to about 60 wt. %, or from about 25 wt. % to about 55 wt. %, or from about 40 wt. % to about 50 wt. %.

Alternatively, the conductive nanowires and/or conductive nanorods may carbon nanotubes doped to reduce the intrinsic band gap of the carbon nanotube; or single wall carbon nanotubes or multi-wall carbon nanotubes having a mass fraction to the doped semiconductor particles in a range from about 1.5 wt. % to about 30 wt. %.

The conductive nanowires and/or conductive nanorods may have a length ranging from about 1 μm to about 50 μm, or from about 2 μm to about 20 μm, or from about 5 μm to 10 about μm; and they may have an aspect ratio ranging from about 1 to about 500, or from about 2 to 200, or from about 3 to 100.

In a second aspect, the present disclosure provides a sol-gel paste, comprising:

a liquid sol-gel having disbursed throughout
 i) doped semiconductor particles of at least one type, said doped semiconductor particles of at least one type having either a perovskite crystal structure or a tungsten-bronze crystal structure and exhibiting a positive thermal coefficient of resistivity above a threshold switching temperature, and ii) conductive nanowires or conductive nanorods, or both, to facilitate electrical conduction between said at least one type of doped semiconductive particles.

In this second aspect the sol-gel paste may further comprise the doped semiconductor particles of at least one type having conductive particles bound to an outer surface of said one or more types of doped semiconductor particles.

In this second aspect the doped semiconductor particles of at least one type may have a perovskite crystal structure and are any one of $BaTiO_3$, $KNbO_3$, $SrTiO_3$, $CaTeO_3$, $SrTeO_3$, $BaTeO_3$, $SrNbO_3$, $KNaNbO_3$ and combinations thereof.

In this second aspect the doped semiconductor particles of at least one type may have a tungsten-bronze crystal structure and are any one of $BaNb_2O_6$, $Sr_2KNb_5O_{15}$, $Ba_4Na_2Nb_{10}O_{20}$ and combinations thereof. These doped semiconductor particles of any one of $BaNb_2O_6$, $Sr_2KNb_5O_{15}$, $Ba_4Na_2Nb_{10}O_{20}$ and combinations thereof may be combined with $TiO_2$ powder and sintered in a reducing environment at a temperature in a range from about 900° C. to about 1450° C., or from about 1200° C. to about 1375° C., to produce electrically conductive phases within the sintered semiconductor powder formulation.

In this second aspect the conductive nanorods or conductive nanowires, or both, may be comprised of one or more of Ag, Cu, Ni, Au, Al, Fe, Pd, Pt, Si, $TiO_2$, ZnO, $RuO_2$, indium-tin oxide (ITO). Alternatively, these nanorods and/or nanowires may be Cu—Ni nanorods and/or nanowires with a core-shell structure comprised of a copper nanowire or nanorod onto which one or more atomic layers of nickel has been deposited.

In this second aspect the mass fraction of the Cu—Ni nanorods to the doped semiconductor particles in the semiconductor powder may range from about 10 wt. % to about 60 wt. %, or from about 25 wt. % to about 55 wt. %, or from about 40 wt. % to about 50 wt. %.

In this second aspect the conductive nanorods and/or conductive nanowires having a length ranging from about 1 μm to about 50 μm, or from about 2 μm to about 20 μm, or from about 5 μm to 10 about μm.

In this second aspect the conductive nanorods and/or conductive nanowires may have an aspect ratio ranging from about 1 to about 500, or from about 2 to 200, or from about 3 to 100.

In this second aspect the conductive nanowires and/or conductive nanorods may be carbon nanotubes doped to reduce the intrinsic band gap of the carbon nanotube; or they may be single wall carbon nanotubes or multi-wall carbon nanotubes having a mass fraction to the doped semiconductor particles in a range from about 1.5 wt. % to about 30 wt. %.

In a third aspect the present disclosure provides a sol-gel paste, comprising:
 i) a semiconductor powder formulation formed by a solid solution comprised of at least one of doped $BaNb_2O_6$, $Sr_2KNb_5O_{15}$ and $Ba_4Na_2Nb_{10}O_{20}$ powder particles combined with $TiO_2$ powder and sintered in a reducing environment at a temperature in a range from about 900° C. to about 1450° C., or from about 1200° C. to about 1375° C., to produce electrically conductive phases within the sintered semiconductor powder formulation;
 ii) conductive nanowires and/or conductive nanorods distributed throughout the sintered semiconductor powder formulation forming a powder mixture; and
 iii) the powder mixture disbursed throughout a liquid sol-gel formulation to form the sol-gel paste.

In this third aspect, the surfaces of the doped $BaNb_2O_6$, $Sr_2KNb_5O_{15}$ and $Ba_4Na_2Nb_{10}O_{20}$ powder particles may have conductive metallic particles bound to an outer surface of the powder particles, said conductive metallic particles comprised of at least one conductive transition metal or a conductive transition metal oxide to create a metal-semiconductor or a metal oxide-semiconductor junction, which in combination with the nanorods and/or nanowires facilitates electrical conduction between the semiconductor powder particles in the final formulation.

In this third aspect, a mass fraction of $TiO_2$ in the semiconductor powder may range from about 0.5 to about 50 wt. %, or from about 15 wt. % to about 30 wt. %, or from about 20 wt. % to about 25 wt. %.

In this third aspect, the doped semiconductor may be doped with $Sm_2O_3$ prior to sintering whereby the mass fraction of $Sm_2O_3$ in the sintered semiconductor powder formulation ranges from about 0 wt. % to about 5 wt. %, or from about 0.1 wt. % to about 1 wt. %, or from about 0.2 wt. % to about 0.5 wt. %.

In this third aspect, the doped semiconductor may be $BaNb_2O_6$ doped by $Sm_2O_3$ wherein a mass fraction of $Sm_2O_3$ in the sintered semiconductor powder formulation may range from about 0.2 wt. % to 0.5 wt. %, and wherein a mass fraction of $TiO_2$ in the sintered semiconductor powder formulation ranges from about 15 wt. % to about 30 wt. %.

In this third aspect, the sol-gel paste may further comprise a sintering aid being any one or combination of $MnO_2$, CuO, CoO, $Fe_2O_3$, MgO, CaO and $Li_2O$—$Al_2O_3$—$SiO_2$.

In this third aspect, the sol-gel paste may further comprise a sintering aid being $MnO_2$ having a mass fraction in the sintered semiconductor powder formulation in a range from about 0.1 wt. % to about 5 wt. %, or from about 0.5 wt. % to about 2.5 wt. %, or from about 0.75 wt. % to about 1.25 wt. %.

In this third aspect the conductive nanorods and/or conductive nanowires may have a length ranging from about 1 μm to about 50 μm, or from about 2 μm to about 20 μm, or from about 5 μm to 10 about μm.

In this third aspect the conductive nanorods and/or conductive nanowires may have an aspect ratio ranging from about 1 to about 500, or from about 2 to 200, or from about 3 to 100.

In this third aspect the conductive nanowires and/or conductive nanorods may be carbon nanotubes doped to reduce the intrinsic band gap of the carbon nanotube; or they may be single wall carbon nanotubes or multi-wall carbon nanotubes having a mass fraction to the doped semiconductor particles in a range from about 1.5 wt. % to about 30 wt. %.

In this third aspect the conductive nanorods or conductive nanowires, or both, may be comprised of one or more of Ag, Cu, Ni, Au, Al, Fe, Pd, Pt, Si, $TiO_2$, ZnO, $RuO_2$, indium-tin oxide (ITO).

In this third aspect the conductive nanorods or conductive nanowires, or both, may be comprised of Cu—Ni nanorods and/or nanowires with a core-shell structure comprised of a copper nanowire or nanorod onto which one or more atomic layers of nickel has been deposited. A mass fraction of the Cu—Ni nanorods to the doped semiconductor particles in the semiconductor powder ranges from about 10 wt. % to about 60 wt. %, or from about 25 wt. % to about 55 wt. %, or from about 40 wt. % to about 50 wt. %.

In this third aspect the conductive nanowires and/or conductive nanorods may be comprised of carbon nanotubes doped to reduce the intrinsic band gap of the carbon nanotube; or they may be single wall carbon nanotubes or multi-wall carbon nanotubes having a mass fraction to the doped semiconductor particles in a range from about 1.5 wt. % to about 30 wt. %.

In all three aspects of this disclosure the liquid sol-gel is a liquid metal oxide sol-gel comprising any one or combination of aluminum oxide, samarium oxide, niobium oxide, silicon dioxide, titanium oxide, strontium titanate and barium titanate.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which:

FIG. 1b is a top view of the thick film heater of FIG. 1a.

DETAILED DESCRIPTION

Figure 1A:
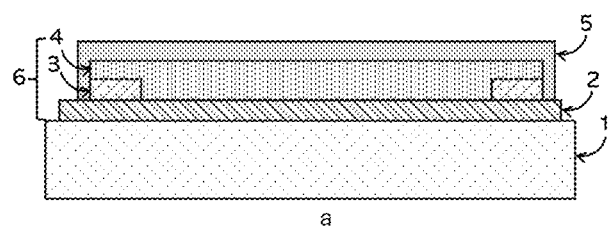
FIG. 1a is a cross-sectional view of a thick film heater.

A detailed description is provided below to facilitate a thorough understanding of the disclosed embodiments and connections thereof. The description is not limited to any particular example included herein.

Various embodiments and aspects of the disclosure will be described with reference to the details discussed below. The following description and drawings are illustrative of the disclosure and are not to be construed as limiting the disclosure. Numerous specific details are described to provide a thorough understanding of various embodiments of the present disclosure. The Figures are not to scale. Further, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure. Unless otherwise specified, the terms "about" and "approximately" mean plus or minus 25 percent or less.

It is to be understood that unless otherwise specified, any specified range or group is as a shorthand way of referring to each and every member of a range or group individually, as well as each and every possible sub-range or sub-group encompassed therein and similarly with respect to any sub-ranges or sub-groups therein. Unless otherwise specified, the present disclosure relates to and explicitly incorporates each and every specific member and combination of sub-ranges or sub-groups.

As used herein, the term "on the order of", when used in conjunction with a quantity or parameter, refers to a range spanning approximately one tenth to ten times the stated quantity or parameter.

As used herein, the phrase "Currie temperature" is defined as the temperature at which a semiconductor undergoes a phase transition from a low temperature ferroelectric phase to a high temperature paraelectric phase upon heating.

As used herein, the phrase "light off temperature" (we coin the phrase) means refers to the transition temperature at or near the Tamman temperature of the material, above which oxygen diffusion into the lattice of the material which becomes facile and the oxidation rate of the material becomes significant, such that a rapid increase in resistivity of the material is observed when heated above this temperature in an oxidative environment.

In the course of conducting exploratory research into the nature of the PTCR behavior of the niobate-based material described by Zajc and Drofenik [11], the current inventors serendipitously found that highly conductive $TiO_2$ doped $BaNb_2O_6$ based ceramic material can be made with useful self-limiting characteristics. The inventors found that by significantly increasing the $TiO_2$ mass fraction up to 15 to 20% and by introducing a sintering aid, a very conductive and stable resistive material could be created with a positive temperature coefficient (a) of resistivity over a broad range of temperature including the intended region of many heater applications. Although this material did not exhibit a classic PTCR effect due to a change in the crystal structure, the inventors discovered that the resistivity increased by over 3 to 5 orders of magnitude over a very narrow range of temperature near 480 to 500° C. (Example 1). This apparent rapid switching PTCR effect was determined to be due to irreversible oxidation of the material.

Although this apparent PTCR effect is not reversible, it occurred to the inventors that this phenomenon can be exploited to provide a fail-safe feature in thick film resistive heaters, effectively terminating the electrical flow through the heater circuit permanently if the heater should exceed this critical temperature. This critical temperature is henceforth referred to as its "light off temperature" in recognition that this is a single use material whose rapid switching R-T response is due to irreversible oxidation and not a true PTCR effect with an associated Curie Temperature. Subsequent experiments showed that the "light off" temperature can be modified by the synthesis variables and by the composition of the barium niobate semiconductor. When incorporated into a sol gel paste, as described herein, the light off temperature and characteristics can be further modified.

$BaNb_2O_6$ has a tungsten bronze crystal structure. Similar "light off" behavior was also observed by the inventors in experiments with other niobates with tungsten bronze structure including doped barium sodium niobate ($Ba_4Na_2Nb_{10}O_{30}$), i.e. BNN and doped potassium strontium niobate ($KSr_2Nb_5O_{15}$), i.e. KSN. BNN based materials after sintering in a reducing environment gave a lower light off temperature near 400° C. and with a more gradual change in resistivity but with a more substantial PTC jump of about 5 orders of magnitude near 500° C. The inventors found that by modifying the composition, the light off temperature could be lowered to around 300° C. KSN doped with Nd or La showed substantial increase in resistivity at light off temperatures around 300 and 400° C. but showed relatively high initial resistivity compared to BN or BNN based materials.

Thus, the present invention integrates one or more of these doped niobate-based materials or the like, having been sintered in reducing environment, and exhibiting stable and very low room temperature resistivity, typically with flat or with positive TCR until a light off temperature around 250 to 500° C., after which the resistivity increases rapidly with temperature by several orders of magnitude. Thus, these materials may be used as novel active ingredients in a ceramic sol-gel paste intended for use in high temperature thick film heaters, to provide a screen printable resistive circuit, with excellent resistor stability and with inherent safe design owing to irreversible oxidation of the PTCR material at elevated temperature.

To the best of the inventors' knowledge, the successful integration of semiconductive PTCR materials into sol gel pastes have not been reported prior to this invention disclosure. PTCR materials are typically pressed into pellets, disks, plates or traces and applied directly into heaters as heating elements, for example, as described by Bohlender et al. who describe plate shaped PTCR heating elements used in an automotive heater and Allston et al. who describe a disk-shaped PTC resistor used in a vaporizer for a fuel injector for an automobile. When trying to incorporate conductive PTCR material into an insulative sol-gel paste, several issues arise which inhibits the electrical communication through the conductive PTCR material that is dispersed in the insulative inorganic sol gel matrix. To incorporate semiconductive PTCR materials into a sol-gel paste that is amenable to spray or screen printing, one must first reduce the particle size typically to 10 micron or less. Consequently, the contact resistance between particles becomes very high, increasing by several orders of magnitude, resulting in an extremely resistive material that is not amenable to electrical conduction, even prior to introducing to the sol-gel paste.

Secondly, when integrated into the sol-gel paste, the PTCR particles become coated in an insulative matrix which further prevents the conduction of electricity through the film. The present inventors discovered, over several years of research, that this challenge can be overcome in two stages. First, the inventors discovered that the contact resistance between adjacent semiconductor particles can be substantially reduced, by several orders of magnitude, by creating a metal-semiconductor junction by decorating the semiconductor particles with metallic nanoparticles or larger metal crystallites, such as silver particles. Although this contact resistance between small particles can be substantially reduced, when these decorated particles are integrated into the sol-gel paste, the film remains highly resistive due to the insulating effect of the sol gel matrix in the interparticle regions between clusters of semiconductor particles. The present inventors discovered that the electrical communication between semiconductive particles within the sol-gel paste can be restored via the introduction conductive nanowires or nanorods with certain characteristic length and aspect ratio.

With these innovations, the present inventors discovered that a screen printable thick film paste can be screen printed and fired at sufficiently low temperature, typically less than 430° C., such that the reduced semiconductor phases did not oxidize within the oven resulting in an electrically conductive resistor with intrinsic safe design. In particular, when reduced barium niobate was used as the PTCR material, which was subsequently decorated with silver particles and introduced to the sol-gel paste with a samarium oxide sol-gel binder along with metallic nanowires comprised of copper nanowires decorated with nickel as described by Rathmell et al. [14, 15], the resultant resistor showed good sheet resistance around 90Ω/□ "ohm per square", with good thermal uniformity at a power density of around 55 W/cm$^2$ and provided fail safe PTCR characteristic with significant positive and linear TCR of 1800 ppm/K prior to the light off temperature around 500° C., after which, the conductive phases irreversibly oxidize providing (single use) self-limiting behavior.

The inventors found that the sheet resistance can be tuned by blending pastes with different sheet resistances, which in turn can be adjusted by varying the composition of the resistor paste, particularly by varying the silver mass fraction, and Cu—Ni nanorod mass fractions relative to the PCTR material mass fraction. The resistor was found to be stable (<1% drift) when exposed to humidity in an environmental chamber at 85% relative humidity and 85° C. for 24 hours, in accordance with standard protocol and was found to be resistant to oxidation with good stability during operation. Dry run tests, wherein heater prototypes were energized at constant voltage and allowed to heat up until failure, consistently showed self-limiting behavior, preventing overheating and arcing of the device.

Figure 1B:
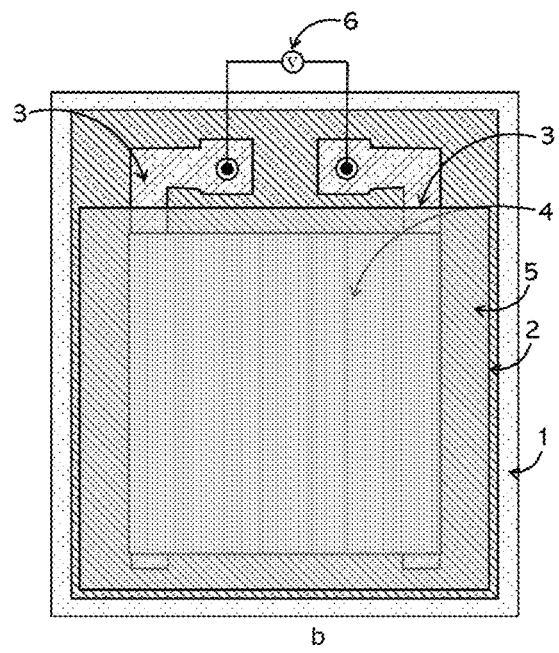

FIGS. 1a and 1b show a thick film heater that includes a substrate 1 which depending on the application may be insulating or metallic, a dielectric coating 2 located directly on substrate 1, which may be a single layer or multiple dielectric layers. Two conductor strips/bus bars 3 positioned along the peripheral edge of the electrically conductive resistive heater layer 4. Bars 3, may be sandwiched between the dielectric coating 2 and layer 4, or it may be located on top of layer 4. A finishing coat 5 may be located on top of heater layer 4. Herein, the phrase "thick film heater coating 4 is a coating with thickness in micrometer scale, typically from 0.1 to 100 micrometers.

As known to one skilled in the art, thick film ceramic coatings may be produced by loading conventional sol-gel solutions with up to about 90% by weight of finely divided ceramic particles. The resulting slurry or paint can be dip-coated, spin cast, sprayed, painted or screen printed onto a substrate, either planar or non-planar, then fired to remove the organic materials including solvents, to create a microcrystalline structure.

According to the present invention, a conductive film with self-limiting behavior can be produced by either dip coating, spin coating, spraying or screen printing and subsequently firing a paste that is produced by the sol-gel method, for which insulative and conductive powders are introduced into the sol gel solution. The conductive phases are created from the addition of particles consist of semiconductor materials that have been first decorated with metallic particles to form metal-semiconductor junctions and whose electrical connectivity have been further enabled by the introduction of conductive nanomaterials, particularly nanowires or nanorods into the sol-gel solution. The resistor film can be engineered to either increase or decrease its conductivity by controlling the proportion of conductive to insulative particles in the film and can be engineered to exhibit substantial PTCR effect (positive thermal coefficient of resistivity) by controlling the nature and mass fraction of the conductive nanomaterials used in the paste to enable the electrical connectivity of the semiconductor particles.

In the preferred embodiment, the semiconductor is a solid solution of $TiO_2$ and at least one of the following niobate materials exhibiting a tungsten bronze structure: {barium niobate (BN), potassium sodium niobate (KNN), potassium niobate (KN)}. The solid solution is optionally doped, by aliovalent ion doping. The doped niobate material is combined with $TiO_2$ and optionally with a sintering aid and sintered at elevated temperature in a reducing environment, such as in the presence of hydrogen at temperatures typically ranging from 1100 to 1350° C. for times ranging from 2 to 6 hours, dependent on the material. In the preferred embodiment, the niobate material is barium niobate ($BaNb_2O_6$) which has been doped by $Sm_2O_3$ whereby the mass fraction of $Sm_2O_3$ in the material to be sintered ranges from 0 to 5 wt. %, more preferably from 0.1 to 1.0 wt. % and most preferably from 0.2 to 0.5 wt. %. The mass fraction of $TiO_2$ in the material to be sintered ranges from 0.5 to 50 wt. %, more preferably the $TiO_2$ mass fraction ranges from 15 to 30 wt. %, and most preferably the $TiO_2$ mass fraction ranges from 20 to 25 wt. %. In the preferred embodiment, $MnO_2$ is used as a sintering aid, whose mass fraction in the material to be sintered ranges from 0.1 to 5 wt. %, more preferably from 0.5 to 2.5 wt. % and most preferably from 0.75 to 1.25 wt. %.

The semiconductor material that has been sintered in reduced environment is decorated by either metallic or conductive metal oxide particles to create a metal-semiconductor junction. In the preferred embodiment, the conductive metal particles are silver, created from the wet impregnation of the PTCR material by silver nitrate. The mass fraction of Ag in the decorated semiconductor powder ranges from 0 to 20 wt. %. More preferably, the mass fraction of Ag in the decorated semiconductor powder ranges from 5 to 15 wt. %. Most preferably, the mass fraction of Ag in the decorated semiconductor powder ranges from 7 to 10 wt. %.

A nanomaterial is used to provide electrical connectivity between clusters of decorated PTCR particles within the sol gel film. In the preferred embodiment, the nanomaterial is a Cu—Ni nanorod comprised of a copper nanowire that has been decorated by nickel to impart resistance to oxidation. The nanorod has a length ranging from 1 to 50 μm, more preferably with length ranging from 2 to 20 μm and most preferably with length ranging from 5 to 10 μm and having an aspect ratio ranging from 1 to 500, more preferably having an aspect ratio ranging from 2 to 200 and most preferably having an aspect ratio ranging from 3 to 100. In the preferred embodiment, the nanomaterial is a Cu—Ni nanorod with a core shell structure, whereby a copper nanorod has been decorated by one or more atomic layers of nickel, having an aspect ratio of 1 to 500, more preferably having an aspect ratio of 2 to 200 and most preferably having an aspect ratio of 3 to 100. The length of the nanorod ranges from 1 to 50 μm, more preferably the length of the nanorod ranges from 2 to 20 μm, most preferably the length of the nanorod ranges from 5 to 10 μm.

The sol gel binder is chosen for a given application is dependent on the substrate to which the resistor film is bound, as would be known to one skilled in the art, in order to achieve good chemical adhesion as well as good matching of the coefficient of thermal expansion of the resistor film with the dielectric layer or substrate to which the resistor film is deposited. In the preferred embodiment, a hydrophobic $Sm_2O_3$ binder is favored, where possible, in order to afford additional protection of the resistor against humidity.

The self-limiting thick film PTCR resistor compositions disclosed herein will now be illustrated by the following non-limiting examples.

Example 1

Powdered $BaCO_3$ and $Nb_2O_5$ are mixed together and then calcined to form powdered $BaNb_2O_6$. This powder is then mixed with $TiO_2$, $MnO_2$ and $Sm_2O_3$ and then pressed into pellets followed by sintering in a reduction environment (5% $H_2$ in $N_2$) to produce a solid solution of $BaNb_2O_6$ with $TiO_2$ doped with Sm and Mn. The pellets are then characterized by measuring the resistivity versus temperature to confirm they exhibit PTC.

In more detail, a solid solution of doped barium niobate ($BaNb_2O_6$) and $TiO_2$ was synthesized from the high temperature solid state reactions of $BaCO_3$, $Nb_2O_5$, $TiO_2$, $MnO_2$ and $Sm_2O_3$. 47.18 g $BaCO_3$ and 63.48 g $Nb_2O_5$ was first milled in 165 g isopropanol and 300 g of 3-mm $ZrO_2$ balls using a planetary milling (Retsch® PM 100) at 200 rpm for 1 hr. After drying, the milled powder was calcined in air at 1100° C. for 1 h with 5° C./min heating and cooling. The calcined powder was then milled with the addition of 22.97 g $TiO_2$, 0.21 g $MnO_2$ and 0.41 g $Sm_2O_3$ using the same planetary milling process. After drying, pellets with 1.0 mm thickness were prepared using a pellet press (Across International® MP24A at 100 bar) and subsequently sintered in a reducing environment in a controlled atmosphere muffle furnace, under a 2.5 L/min flow of hydrogen 5.0 vol. % in balance nitrogen at 1355° C. for 5 h 48 minutes with 5° C./min heating and cooling in UHP nitrogen during the ramp up and ramp down from the sintering condition. This reduction process chemically transformed the material into reduced phases.

The sintered pellet was coated by brushing Ga—In eutectic on both sides of the pellets to create current collectors before assembling with high temperature wires using ceramic plates and stainless-steel miniature spring clamps. The TCR behavior of the material was characterized by heating the sample in an oven (Bartlett) up to 540° C., while monitoring the conductivity (resistance) through the pellet at constant voltage using 4-wire method using a Keysight DAQ970A data acquisition system. For this experiment, the furnace was heated up at 5° C./min and the temperature held constant at pre-determined setpoints for 10 minutes to reach stable temperature before recording resistance and temperature.

Figure 2:
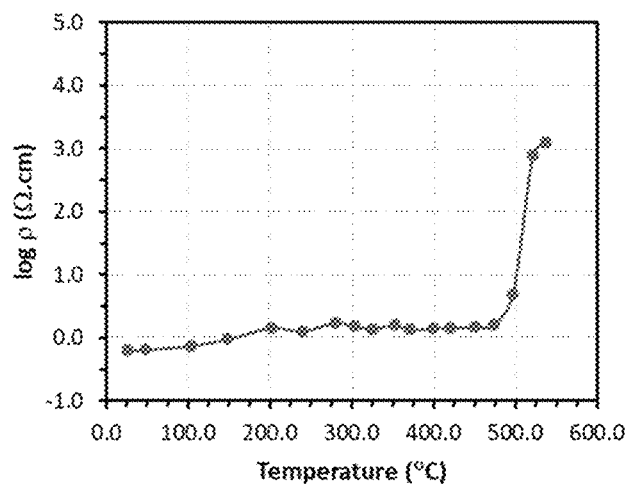
FIG. 2 is a semi-log plot of the steady state resistivity (Ω·cm) of a barium niobate based PTCR pellet as a function of temperature (° C.) when heated in an oven.

The average steady state resistance at each temperature is plotted in FIG. 2. The results shows that the material exhibits relatively stable conductivity over a broad range of temperature, while rapidly increasing in resistivity by several orders of magnitude over a very narrow range of temperature around 500° C. Significantly, the thermal coefficient of resistivity (TCR) of the material is positive in the region leading up to the critical temperature, indicating a positive TCR (i.e., PTCR) characteristic of the material.

Example 2

A solid solution of doped barium niobate ($BaNb_2O_6$) and $TiO_2$ was synthesized and chemically reduced following the procedure of Example 1 with one deviation, the material remained in powder form when sintered and not pressed into a pellet. After sintering, the powder (230 g) was coarse with approximately 1 mm characteristic dimension. This powder was split into two sets. In one set, the coarse powder was pressed into pellets and the resistance at room temperature measured. In the other set, the coarse powder was milled with 10-mm zirconia balls (100 pieces) using the planetary milling at 500 rpm for 30 minutes to obtain BN fine powder with particle size below 15 μm, and then pressed into a pellet. The resistance at room temperature was measured.

Figure 3:
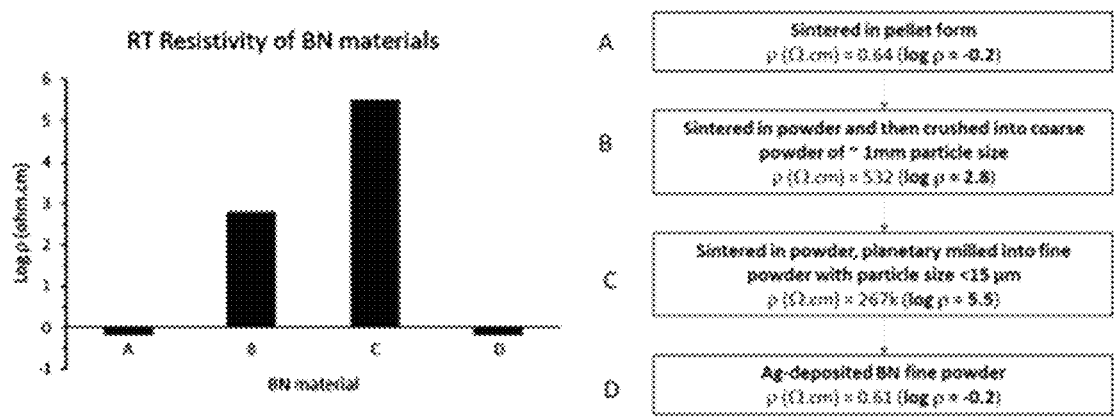
FIG. 3 is a histogram of the log of the resistance of the same barium niobate based PTCR material in pellet form after various preparation methods including: A) sintered after being pressed in a pellet; B) sintered in powder form (fine particles) C) sintered in powder form (coarse particles); and D) sintered in powder form (fine particles) after the PTCR powder was decorated with silver particles.

The results in FIG. 3 show that when the particle size of the PTCR material is substantially reduced after sintering, the contact resistance increases profoundly. For example, when in powder form before sintering and ground to a fine powder after sintering, the resistance of the pellet was over 5 orders of magnitude greater than when the material was sintered in pellet form. Some of the milled powder was decorated with silver particles. Specifically, Ag particles were deposited on the PTCR powder via a wet impregnation using $AgNO_3$ precursor, followed by reduction of $AgNO_3$. For clarity, 2.76 g $AgNO_3$ in 81.12 g DI water was used to impregnate 25.0 g of the PTCR powder by repeating wetting and water evaporation at 75° C. The $AgNO_3$-impregnated powder was reduced with a fresh solution of 0.92 g $NaBH_4$ in 487 ml chilled DI water at 7° C. for 15 minutes under magnetic stirring, followed by filtering, washing with DI water and drying at 95° C. The powder was pressed into a pellet and the resistance was measured and found to be comparable to the case where the PTCR material was sintered in the pellet form.

Example 3

Figure 4:
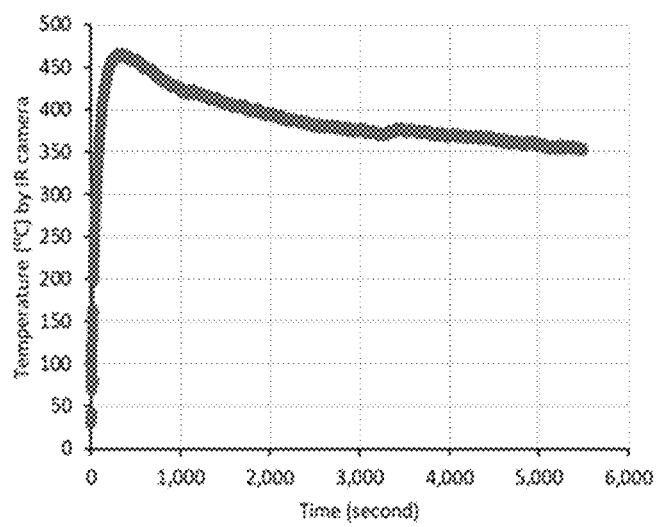
FIG. 4 is a plot of resistor temperature (measured with an IR camera) versus time for a prototype resistive heater whereby the sol-gel resistor film contains barium niobate based PTCR material and multi-wall carbon nanotubes (MWCNT) and the heater is energized at a constant voltage of 110 Volts (V) with a power density of 8.5 Watts/cm² (W/cm²).

A solid solution of doped barium niobate and $TiO_2$ was synthesized and chemically reduced following the procedure of Example 2 and combined with multi-wall carbon nanotubes before being combined with a binder to create a sol-gel paste. Specifically, 4.12 g of Ag-decorated PTCR powder and 0.37 g of MWCNT powder were manually mixed in a container with a spatula for 10 minutes. 5.50 g of alumina sol-gel binder, 1.04 g of solvent (1,2-propanediol) were added into the powder mixture. The mixture was gently mixed with a spatula to wet the powder prior to 3-roll milling, which resulted in a homogeneous paste suitable for screen printing. The paste was subsequently screen printed onto stainless steel coupons that were pre-coated with Ferro blue dielectric and with bus bars screen printed using Dupont conductor paste using screen with mesh number of 137. The printed resistor film was then fired in a muffle furnace at 420° C. for 30 minutes under a flow of 5% $H_2$ in $N_2$. The protype heater was energized at a constant voltage of 110 V and its temperature monitored using a FLIR infrared thermal camera. The results illustrated in FIG. 4, show that the heater exhibited self-limiting behavior, with a maximum temperature of less than 470° C. being achieved.

Example 4

The results of example 3, demonstrate proof of principle. However, the heater voltage was limited to 110 V and a relatively low power density (8.5 W/cm$^2$) due to the relatively low oxidation rate of the barium niobate based PTCR material. This slow oxidation rate also prevented the resistor from shutting off completely. To improve this result, oxygen storage compounds (OSC) were integrated into the paste. These OSC store oxygen and release oxygen at or near the light off temperature, when the resistor becomes oxygen starved during oxidation, due to the limits of oxygen diffusion within the semiconductor. The mass ratio between OSC and the decorated PTCR powder can be determined from the oxygen storage capacity of the OSC and the required oxygen amount for a complete oxidation of the decorated PTCR powder. A solid solution of doped barium niobate ($BaNb_2O_6$) and $TiO_2$ was synthesized and chemically reduced following the procedure of Example 2. An OSC, $Sr_{0.90}Ca_{0.10}FeO_3$ was synthesized from the high temperature solid state reactions of $SrCO_3$, $CaCO_3$ and $Fe_2O_3$. 58.99 g $SrCO_3$, 4.44 g $CaCO_3$ and 36.56 g $Fe_2O_3$ was first milled in 150 g DI water and 650 g of 3-mm $ZrO_2$ balls in a 500 ml plastic bottle using a ball milling at 160 rpm for 3 hr. After drying, the milled powder was calcined in air at 850° C. for 40 h with 1.5° C./min heating and cooling ramp rates.

The calcined powder was subsequently milled using the same milling process, followed by sintering in air at 1100° C. for 64 h with 1.5° C./min heating and cooling ramp rates. The grinding of the sintered OSC was performed in the same manner as the PTCR powder. A screen printable sol-gel paste was formulated by combining the silver decorated PTCR material with the OSC powder and with multi-wall carbon nanotubes (MWCNT) into an alumina sol-gel binder. For clarity, 3.54 g of the decorated PTCR powder was combined with 0.89 g OSC such that the mass ratio of OSC/PTCR was 0.25, and with 0.80 g MWNCT powder. The ingredients were mixed well and then added to 5.50 g of the alumina sol-gel binder along with 3.60 g of solvent (1,2-propanediol). The mixture was gently mixed to wet the powder prior via 3-roll milling resulting in a homogeneous paste suitable for screen printing. The paste was screen printed on stainless steel coupons precoated with ceramic dielectric and Ag current collectors using screen with mesh number of 137. The printed film (3.5 cm×3.5 cm) was then fired in a belt oven at a maximum temperature of 415° C. for a total time of 25 minutes.

Figure 5:
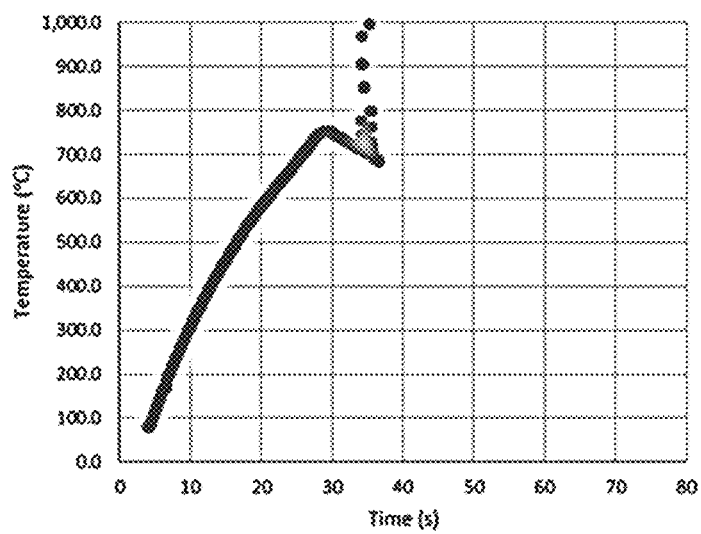
FIG. 5 is a plot of resistor temperature versus time for a prototype resistive heater whereby the resistor film contains barium niobate based PTCR material as well as oxygen storage compounds and multi-wall carbon nanotubes (MWCNT) and for which the heater is energized at a constant voltage of 180 V and a power density of 32.5 W/cm².
Figure 6:
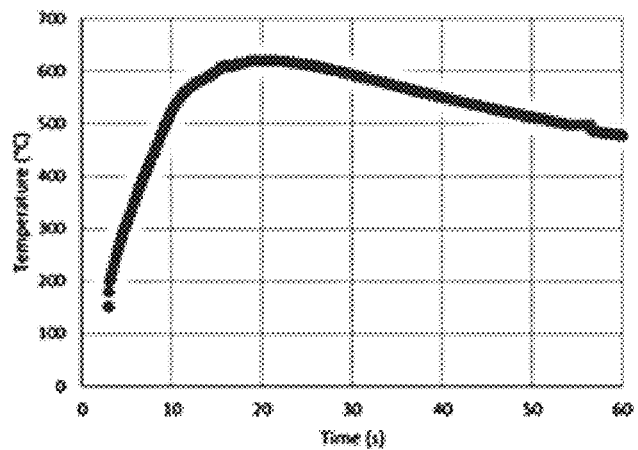
FIG. 6 is a plot of resistor temperature versus time for a prototype resistive heater whereby the resistor film contains barium niobate based PTCR material and Cu—Ni nanorods and for which the heater is energized at a constant voltage of 230 V with a power density of 55 W/cm².

The resulting prototype heater was energized at a constant voltage of 180 V and its temperature monitored using thermal imaging as illustrated in FIG. 5. The results illustrated in FIG. 5 show that the maximum temperature was limited to about 600° C. before the resistor oxidized tripping the circuit within about 30 seconds. The results demonstrate self-limiting behavior with the response occurring more rapidly and enabling much higher power density. However, some arcing was evident in this experiment around 35 seconds during cool down of the heater, indicated in FIG. 5 by transient observations of very high temperature.

Example 5

Cu—Ni nanorod as described by Rathmell et al. were synthesized by decorating Cu nanowires with nickel. The Cu—Ni nanorods (1.00 g) were dispersed in isopropanol (40 ml) in a 50 ml beaker along with Ag-decorated PTCR powder (1.11 g). The suspension was subsequently sonicated for 5 minutes using a probe sonicator (Q700 Qsonica® sonicator at 50% amplitude) to achieve a uniform dispersion. The sonicated dispersion was then evaporated in an oven (JEIO) at 80° C. to remove all of the solvent. The dried mixture of powders was transferred to a mortar and then 2.74 g $Sm_2O_3$ sol-gel binder with a solid content of about 6.5 wt. %, 2.00 g 1,2-propanediol were added into the mortar. The paste was manually mixed for 10 minutes using a pestle and a plastic spatula. The paste was then printed on stainless steel coupons pre-coated with blue dielectric and conductor using a screen with mesh number of 60. The printed film was then fired in a belt oven at a maximum temperature of 440° C. for a total time of 12 minutes. The resultant prototype heater was energized at constant voltage of 230 V and its resistor temperature was monitored by thermal imaging. The results show that the heater exhibited self-limiting behavior with a maximum temperature being constrained to less than 650 C. The heater showed robust operation, with no arcing at a high power density of 55 W/cm$^2$.

Example 6

Figure 7:
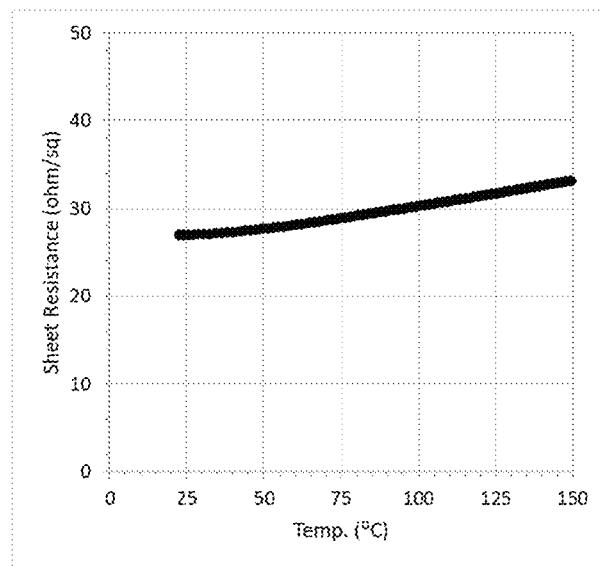
FIG. 7 is a plot of sheet resistance of a prototype heater as a function of temperature whereby the resistor film contains barium niobate based PTCR material and Cu—Ni nanorods, when measured in a Model OF-02G oven produced by JEIO Tech oven.

The PTCR resistor of Example 3 with MWCNT, not only showed challenges with arcing during operation, which limited the maximum voltage, but also imparted a negative thermal coefficient of resistivity (TCR) prior to light off, which is undesirable, since the heater becomes more conductive at higher temperatures, thereby creating the potential for run-away conditions when overheating. A positive thermal coefficient of resistivity (PTCR) resistor is desirable since it provides inherent safe design to mitigate the potential for run-away conditions at elevated temperature. A prototype heater with the same sol-gel resistor composition of example 5, enabled by Cu—Ni nanorods, was placed in a convection oven (JEIO) with excellent thermal uniformity and heated from room temperature to 160° C. at a rate of 5° C./min. The resistance was continuously monitored as a function of temperature and given in FIG. 7. From this data, the thermal coefficient of resistivity (TCR) was estimated to be 1820 ppm/K.

Example 7

The PTCR resistor of example 3 utilizing MWCNT exhibits challenges when exposed to humidity. In particular, water can interact with the carbon nanotubes resulting in significant resistor drift, which may be unacceptable in the intended application. A prototype heater with the same sol-gel resistor composition of example 5, enabled by Cu—Ni nanorods, was subjected to a "damp heat" test whereby the heater was placed inside a Tenney model T2RC-A-W4 environmental test chamber within which the temperature and humidity can be precisely controlled. The damp heat test involved conditioning the part at 60% relative humidity for 24 hours at 25° C., then heating the chamber containing the specimen to 85° C. and increasing the relative humidity to 85% and holding this condition for 24 hours. The chamber was then returned to the conditioning temperature of 25° C. and 60% relative humidity. Then the sample was removed from the chamber. The resistance of the heater was continuously monitored in situ throughout the experiment.

Figure 8:
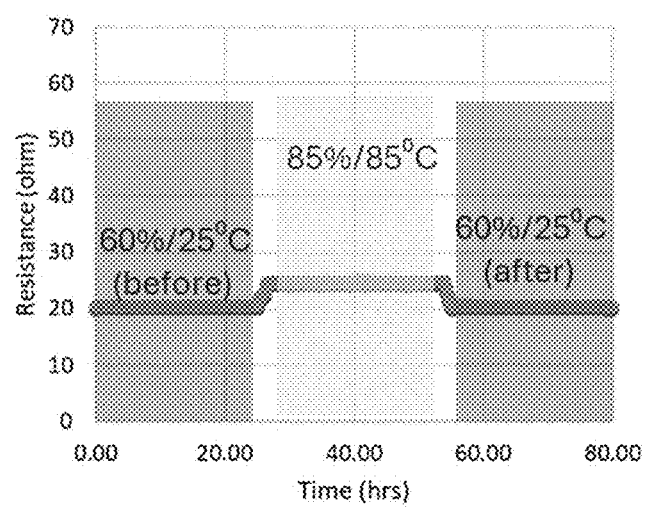
FIG. 8 is a plot of resistance (ohms) versus time (hours) showing resistance drift (relative change in resistance in %) of a prototype heater as a function of time in a Tenney environmental test chamber during a standardized humidity test (Damp heat test: 85° C. and 85% relative humidity for 24 hours).

The results in FIG. 8 show that the resistor maintained excellent stability with only 0.9% drift during the exposure at 85% RH and 85° C. for 24 hours. The resistor returned to its initial condition to within 1.5% upon reducing the temperature and humidity to the standard 60% Rh and 25° C. The major increase in resistance during heat up from 60 to 85° C. can be attributed to the PTCR characteristic of the resistor. Thus, the PTCR resistor film exhibited good resistance to humidity in standard test conditions, which is very desirable for many heater applications. There are several differences between the prototype of example 5 and Example 4. First, in the heater of Example 5, the MWCNTs were replaced with metallic Cu—Ni nanorods with core shell structure, which do not particularly interact with humidity. Second, the hydrophilic alumina binder was replaced with a $Sm_2O_3$ sol-gel binder, which is hydrophobic, which has been shown in tests to substantially improve the resistor's forbearance to humidity. Additionally, OSC were not used in the heater in Example 5.

Sol-Gel Paste

It will be appreciated that the present disclosure applies to producing other sol-gel based products other than thick film heaters. As such, sol-gel pastes produced in accordance with the present disclosure are commercially useful in their own right. The pastes are produced with compositions that reflect the end use of the sol-gel composition once it is sintered or fired once the doped semiconductor particles and any other required/preferred additives are added into the paste, which can then be commercially sold as paste to be processed by the end users for their specific application(s).

Sol-gel pastes can be deposited as thick films onto substrates in various methods including spray deposition, screen printing or dip-coating followed by firing of the coated substrate to cure the film, typically using an oven. Moreover, sol-gel films can be deposited onto various substrates including flat surfaces, corrugated monoliths or curved surfaces. Consequently, it is desirable to mass produce and provide the resistor material to be used in the conductive coating as a paste that can be used in a broad range of applications with different deposition technologies or have its formulation adjusted to address the specific requirements of any given application. For example, in the case of a high voltage coolant heater (HVCH) used for battery conditioning and or cabin heating in electrical vehicles, the substrate is typically a flat plate which can accommodate a sol gel thick film either sprayed or screen printed. However, different automotive companies will have unique circuit layout and substrate geometries in their HVCH designs.

Depending on the complexity of the substrate, screen printing may be preferred as it is more efficient with the paste. However, in more complex geometries, spray deposition may be necessary. Since there may be multiple potential HVCH designs with different circuit layouts and geometries, it may be advantageous to provide paste to end users who can apply custom electronic circuit films to their customized devices.

Another example is a tubular heater, for example a pump heater wherein the thick film traces are screen printed onto a tubular substrate. In this case the thick films are deposited onto a curved substrate rather than a flat substrate. This tubular heater can be affixed to a pipe to heat the fluid moving inside the pipe. Although the paste formulation may be identical as another application for a flat substrate, the process technology required to apply the paste onto the tubular heater as a thick film may be completely different than for a flat substrate. Therefore, from a manufacturing perspective, it would be more efficient to produce the same paste for multiple applications so that different deposition process technologies can be accommodated.

Other than resistive heating, the conductive coatings disclosed herein can be applied for use as a sensor. For example, using carbon nanotubes within the film, the conductivity of the circuit can be modified in a predictable way by its interaction with the ambient humidity. Similarly, materials can be integrated into the paste which can interact with other adsorbates in the ambient, whose adsorption on the thick film can modify the conductivity of the film in a predictable way, thereby providing a useful signal to quantify the adsorbate concentration in the ambient.

The present disclosure provides a method of producing a sol-gel paste, comprising:
  i) producing a powder of doped semiconductor particles of at least one type, said doped semiconductor particles of at least one type having either a perovskite crystal structure or a tungsten-bronze crystal structure and exhibiting a positive thermal coefficient of resistivity above a threshold switching temperature, and
  ii) mixing a powder of conductive nanowires and/or conductive nanorods with the powder of doped semiconductor particles to produce a powder mixture with the conductive nanowires and/or nanorods distributed substantially uniformly throughout the powder of doped semiconductor particles; and
  iii) mixing this second powder mixture with a liquid sol-gel formulation to produce a sol-gel paste with the second powder mixture substantially uniformly distributed throughout the liquid sol-gel.

This method of producing a sol-gel paste can further comprise decorating/coating the surface of the semiconductor particles with conductive metallic particles comprised of at least one conductive transition metal or a conductive transition metal oxide to create a metal-semiconductor junction, which in combination with the nanorods and/or nanowires facilitates electrical conduction between the semiconductor powder particles in the final formulation.

This method includes selecting doped semiconductor particles of at least one type have a perovskite crystal structure that are selected from the group consisting of $BaTiO_3$, $KNbO_3$, $SrTiO_3$, $CaTeO_3$, $SrTeO_3$, $BaTeO_3$, $SrNbO_3$, $KNaNbO_3$ and combinations thereof; or the doped semiconductor particles of at least one type are selected to have a tungsten-bronze crystal structure and are selected from the group consisting of $BaNb_2O_6$, $Sr_2KNb_5O_{15}$, $Ba_4Na_2Nb_{10}O_{20}$ and combinations thereof.

In this method the conductive nanorods or conductive nanowires, or both, are comprised of one or more of Ag, Cu, Ni, Au, Al, Fe, Pd, Pt, Si, $TiO_2$, ZnO, $RuO_2$ and indium-tin oxide (ITO).

In this method the conductive nanorods or conductive nanowires, or both, are Cu—Ni nanorods and/or nanowires with a core-shell structure comprised of a copper nanowire or nanorod onto which one or more atomic layers of nickel has been deposited, and wherein a mass fraction of the Cu—Ni nanorods to the doped semiconductor particles in the semiconductor powder ranges from about 10 wt. % to about 60 wt. %.

In this method the conductive nanowires and/or conductive nanorods are carbon nanotubes doped to reduce the intrinsic band gap of the carbon nanotube.

Alternatively, the conductive nanowires and/or conductive nanorods are single wall carbon nanotubes or multi-wall carbon nanotubes having a mass fraction to the doped semiconductor particles in a range from about 1.5 wt. % to about 30 wt. %.

The conductive nanorods and/or conductive nanowires have a length ranging from
  about 1 µm to about 50 µm, or
  about 2 µm to about 20 µm, or
  about 5 µm to 10 about µm; and
have an aspect ratio ranging from
  about 1 to about 500, or
  about 2 to 200, or
  about 3 to 100.

The present disclosure provides a method of producing a sol-gel paste, comprising:
  i) producing a semiconductor powder formulation by mixing at least one of doped $BaNb_2O_6$, $Sr_2KNb_5O_{15}$ and $Ba_4Na_2Nb_{10}O_{20}$ semiconductor powder combined with $TiO_2$ powder to form a first mixture and sintering the first mixture at a temperature in a range from about 900° C. to about 1450° C. or more narrowly in a range from about 1200° C. to about 1375° C. in a reducing environment to produce a sintered semiconductor powder formulation with electrically conductive phases within the sintered semiconductor powder formulation; and
  ii) mixing a powder of conductive nanowires and/or conductive nanorods with the sintered first mixture to produce a second powder mixture with the conductive nanowires and/or nanorods distributed substantially uniformly throughout the sintered first mixture; and
  mixing this second powder mixture with a liquid sol-gel formulation to produce a sol-gel paste with the second powder mixture substantially uniformly distributed throughout the liquid sol-gel.

This method of producing a sol-gel paste can further comprise, prior to mixing the doped $BaNb_2O_6$, $Sr_2KNb_5O_{15}$ and $Ba_4Na_2Nb_{10}O_{20}$ semiconductor powder with $TiO_2$ powder, decorating/coating the surface of particles of this semiconductor powder with conductive metallic particles comprised of at least one conductive transition metal or a conductive transition metal oxide to create a metal-semiconductor junction, which in combination with the nanorods and/or nanowires facilitates electrical conduction between the semiconductor powder particles in the final formulation.

The mass fraction of $TiO_2$ in the sintered semiconductor powder formulation ranges from about 0.5 wt. % to about 50 wt. %.

More preferred is the mass fraction of $TiO_2$ in the sintered semiconductor powder formulation ranges from about 15 wt. % to about 20 wt. %.

The doped semiconductor may be $BaNb_2O_6$ doped by $Sm_2O_3$ in which a mass fraction of $Sm_2O_3$ in the sintered semiconductor powder formulation ranges from about 0.2 wt. % to 0.5 wt. %, and the mass fraction of $TiO_2$ in the sintered semiconductor powder formulation ranges from about 15 wt. % to about 30 wt. %, and further comprising a sintering aid being any one or combination of $MnO_2$, CuO, CoO, $FezO_3$, MgO, CaO and $Li_2O$—$Al_2O_3$—$SiO_2$.

A preferred sintering aid is $MnO_2$ having a mass fraction in the sintered semiconductor powder formulation in a range from about 0.75 wt. % to about 1.25 wt. %.

In producing the sol-gel paste, the conductive nanorods or conductive nanowires, or both, are comprised of one or more of Ag, Cu, Ni, Au, Al, Fe, Pd, Pt, Si, $TiO_2$, ZnO, $RuO_2$ and indium-tin oxide (ITO), while preferred conductive nanorods or conductive nanowires, or both, are Cu—Ni nanorods and/or nanowires with a core-shell structure comprised of a copper nanowire or nanorod onto which one or more atomic layers of nickel has been deposited, and wherein a mass fraction of the Cu—Ni nanorods to the doped semiconductor particles in the semiconductor powder ranging from about 10 wt. % to about 60 wt. %.

Alternatively, the sol-gel paste can be produced using conductive nanowires and/or conductive nanorods that are carbon nanotubes doped to reduce the intrinsic band gap of the carbon nanotube.

Alternatively, the conductive nanowires and/or conductive nanorods can be single wall carbon nanotubes or multi-wall carbon nanotubes having a mass fraction to the doped semiconductor particles in a range from about 1.5 wt. % to about 30 wt %.

The conductive nanorods and/or conductive nanowires have a length ranging from
  about 1 µm to about 50 µm, or
  about 2 µm to about 20 µm, or
  about 5 µm to about 10 µm; and
have an aspect ratio ranging from
  about 1 to about 500, or
  about 2 to 200, or
  about 3 to 100.

In all embodiments disclosed herein, the liquid sol-gel is any one of metal oxide sol-gels such as, but not limited to, aluminum oxide, samarium oxide, niobium oxide, silicon dioxide and any combination thereof.

After production of the sol-gel paste, it can be packaged and sealed for commercial distribution.

Useful Embodiments

In a first embodiment the present disclosure provides an electrically conductive coating (i.e. a sol-gel resistor film) for a thick film heating device, comprised of one or more kinds of semiconductor particles, having either perovskite or tungsten-bronze crystal structure, and having inherent positive thermal coefficient of resistivity (PTCR) characteristics, that are incorporated into an inorganic sol gel film whereby the semiconductor particles are decorated/coated with conductive metallic particles comprised of at least one transition metal or a conductive transition metal oxide to create a metal-semiconductor junction and or combined with conductive nanowires and/or conductive nanorods to facilitate electrical conduction between the semiconductive particles through the conductive coating.

In this first embodiment the PTCR material has a perovskite crystal structure and is one of the following, $BaTiO_3$, $KNbO_3$, $SrTiO_3$, $CaTeO_3$, $SrTeO_3$, $BaTeO_3$, $SrNbO_3$ and $KNaNbO_3$ or combinations thereof.

In this first embodiment the PTCR material has a tungsten-bronze crystal structure is one of the following, $BaNb_2O_6$, $Sr_2KNb_5O_{15}$ and $Ba_4Na_2Nb_{10}O_{20}$, or combinations thereof.

In a second embodiment the present disclosure further provides an electrically conductive coating (i.e., a sol-gel resistor film) comprising a positive temperature coefficient of resistance (PTCR), whereby the PTCR material is a solid solution of at least one of the following semiconductor particles $BaNb_2O_6$, $Sr_2KNb_5O_{15}$ and $Ba_4Na_2Nb_{10}O_{20}$ combined with $TiO_2$, the PTCR mixture being subsequently sintered at high temperature in a reducing environment to create electrically conductive phases within the semiconductor. The semiconductor particles are decorated/coated with conductive metallic particles comprised of at least one conductive transition metal or a conductive transition metal oxide to create a metal-semiconductor junction which are then combined with conductive nanowires and/or nanorods to facilitate electrical conduction between the doped semiconductive particles through the conductive coating.

In this second embodiment the mass fraction of $TiO_2$ in the semiconductor powder ranges from about 0.5 wt. % to about 50 wt. %, more preferably from about 15 wt. % to about 30 wt. % and most preferably from about 20 wt. % to about 25 wt. %.

In this second embodiment, prior to sintering, including doping the powder mixture with $Sm_2O_3$ whereby the mass fraction of $Sm_2O_3$ in the material to be sintered ranges about 0 to about 5 wt. %, more preferably ranges from about 0.1 to about 1 wt. % and most preferably ranges from about 0.2 to about 0.5 wt. %.

In this second embodiment, oxygen storage and release compounds can be added to accelerate the oxidation rate of the resistor at or around the critical light off temperature and which are any one or combination of $SrCaFeO_3$, $MnO_2$, $LaNiO_3$, $LaMnO_3$, $LaMnNiO_3$, $Ca_2AlMnO_5$, $LaMnFeO_3$, $LaCoO_3$, $La_2CuO_4$.

In both of these embodiments the nanorods and/or nanowires have a length ranging from about 1 to about 50 μm, more preferably with length ranging from about 2 to about 20 μm and most preferably with length ranging from about 5 to about 10 μm and have an aspect ratio ranging from about 1 to about 500 more preferably having an aspect ratio ranging from about 2 to about 200 and most preferably having an aspect ratio ranging from about 3 to about 100.

In both embodiments the metallic particles which decorate/coat the semiconductor particles is any one or combination of a transition metal, metal alloy, bimetallic particles or an oxide of ruthenium, an oxide of rhodium or Indium-Tin Oxide (ITO) and for which the mass fraction of the transition metal in the final semiconductor powder ranges from about 0 to about 50 wt. %, more preferably ranges from about 5 to about 15 wt. % and most preferably ranges from about 7 to about 10 wt. %.

In both embodiments the semiconductor materials to be sintered is doped with an oxide or metal salt of one or more of the following {Ti, La, Ce, Ta, Mo, W, Ba, Na, Y, Eu, Gd, Dy, Sr, Sm, Yb, Pr, Nd, Er} prior to sintering.

In both embodiments including adding a sintering aid being at least one of the following transition metal oxides ($MnO_2$, CuO, CoO, $Fe_2O_3$), MgO, CaO, $LizO-Al_2O_3-SiO_2$ (LAS) is included with the material to be sintered, whereby the mass fraction of the sintering aid ranges from about 0.1 to about 5 wt. %, more preferably from about 0.5 to about 2.5 wt. % and most preferably the sintering aid is $MnO_2$ and its mass fraction in the material to be sinter ranges from about 0.75 to about 1.25 wt. %.

In both embodiments the nanowires and/or nanorods is metallic for which the mass fraction of the metallic nanowires and/or nanorods in the semiconductor powder ranges from about 10 to about 60 wt. %, more preferably ranges from about 25 to about 55 wt. % and most preferably ranges from about 40 to about 50 wt. %.

In both embodiments the nanowires and/or nanorods are Cu—Ni nanorods and/or nanowires with a core-shell structure comprised of a copper nanowire or nanorod that has been decorated by one or more atomic layers of nickel, for which the mass fraction of Cu—Ni nanorod in the semiconductor powder ranges from about 10 to about 60 wt. %, more preferably ranges from about 25 to about 55 wt. % and most preferably ranges from about 40 to about 50 wt. %.

In both embodiments the nanowires and/or nanorods are single wall carbon nanotubes or multi-wall carbon nanotubes for which the mass fraction in the semiconductor powder ranges from about 1.5 to about 30 wt. %, more preferably ranges from about 5 to about 25 wt. % and most preferably ranges from about 10 to about 20 wt. %.

In both embodiments the nanowires and/or nanorods are carbon nanotubes that have been doped to reduce the intrinsic band gap of the carbon nanotube.

In both embodiments the transition metal particles used for the metal-semiconductor junction are chosen from the following: Ag, Au, Pd, Pt, Cr, Mn, Fe, Co, Ni, Cu, Zn, Ru, Rh, W, Ta, Nb and V.

In both embodiments metal alloys or bimetal particles used for the metal-semiconductor junction are chosen from the following: Ag, Au, Pd, Pt, Cr, Mn, Fe, Co, Ni, Cu, Zn, Ru, Rh, W, Ta, Nb, V, Al, Ti, Mg and Mo.

In both embodiments the transition metal particle used to decorate/coat the semiconductor particles to form the metal-semiconductor junction is silver.

In both embodiments the nanorods and/or nanowires are comprised of one or more of the following: Ag, $TiO_2$, ZnO, Cu, Ni, Au, Al, Fe, Pd and Pt.

In both embodiments the nanorods and/or nanowires are comprised of one or more of the following: Indium-Tin Oxide, $RuO_2$ and Si.

REFERENCES

1. Chinese patent CN101412625B, "High curie point lead-free PTC thermal sensitive ceramic resistor material.
2. H. Katsu, U.S. Pat. No. 8,093,170B2, "Semiconductor ceramic material".
3. Japanese unexamined patent application Ser. No. 56/169, 301.
4. Japanese unexamined patent application 2005-255493.
5. K. Fujita et al., U.S. Pat. No. 10,014,097B2, "Semiconductor ceramic composition and PTC thermistor".
6. JP2012-209292A.
7. F. Kazutaka et al., EP3127889A1, "Semiconductor ceramic composition and PTC thermistor".
8. F. Kazutaka et al., EP3202746A1, "Semiconductor ceramic composition and PTC thermistor".
9. K. Ino et al. US2012/0175361A1, "Semiconductor ceramic composition, method for producing the same, PTC element and heat generating module".
10. T. Shamida et al. U.S. Pat. No. 8,067,325B2, "Semiconductor ceramic composition".
11. I. Zajc and M. Drofenik, *J. Euro. Ceram. Soc.,* 1999, 19, 893.
12. EP3334244B1 "Electric Heating Device and PTC Heating Element for Same", E. Bohlender and A. Schwarzer (inventors), assigned to Eberspaecher Catem GMbH and Co. KG.
13. B. K. Allston et al. "Fuel vapor generator for enhanced cold starting of an internal combustion engine", US20080060619A1.
14. A. R. Rathmell et al. "Synthesis of Oxidation-Resistant Cupronickel nanowires for transparent conducting nanowire networks", Nano. Lett. 2012, 12 (6), 3193.
15. B. Wiley and A Rathmell, TW1508922B "Compositions and Methods for Growing Copper Nanowires".

16. P. S. V. S. Rao and K. S. Rao, "Structural and electrical properties of Dy-doped barium sodium niobate ceramics", *Ferroelectrics,* 1990, 102, 183.
17. CN2321259, "Warm Keeping Shoes", Chinese patent (1997).
18. CN2284508Y, "Low-Voltage, ac-dc power supply safety electronic mosquito-repellent incense apparatus" Chinese patent (1996).

Therefore, what is claimed is:

1. A thick film heating device, comprising:
   a) a substrate;
   b) at least one dielectric coating located directly on said substrate;
   c) an electrically conducting resistive inorganic sol gel coating located directly on said dielectric coating, said inorganic sol gel coating having disbursed throughout the sol gel coating doped semiconductor particles of at least one type, said doped semiconductor particles of at least one type having either a perovskite crystal structure or a tungsten-bronze crystal structure and exhibiting a positive thermal coefficient of resistivity above a threshold switching temperature, and
   conductive nanowires or conductive nanorods, or both, to facilitate electrical conduction between said at least one type of semiconductive particles through said electrically conducting resistive inorganic sol gel coating; and
   d) at least two electrical conductor strips located along a peripheral edge of said electrically conducting resistive inorganic sol gel coating, either directly on the inorganic sol gel coating or between the peripheral edge of the inorganic sol gel coating and a peripheral edge of the dielectric coating, the least two electrical conductor strips being connectable to a power supply for providing electrical power to said electrically conducting resistive inorganic sol gel coating.

2. The thick film heating device according to claim 1, further comprising said doped semiconductor particles of at least one type having conductive particles bound to an outer surface of said one or more types of doped semiconductor particles.

3. The thick film heating device according to claim 1, wherein said doped semiconductor particles of at least one type have a perovskite crystal structure and are selected from the group consisting of $BaTiO_3$, $KNbOs$, $SrTiO_3$, $CaTeO_3$, $SrTeO_3$, $BaTeO_3$, $SrNbO_3$, $KNaNbO_3$ and combinations thereof.

4. The thick film heating device according to claim 1, wherein said doped semiconductor particles of at least one type have a tungsten-bronze crystal structure and are any one of $BaNb_2O_6$, $Sr_2KNb_5O_{15}$, $Ba_4Na_2Nb_{10}O_{20}$ and combinations thereof.

5. The thick film heating device according to claim 4, wherein said doped semiconductor particles of any one of $BaNb_2O_6$, $Sr_2KNb_5O_{15}$, $Ba_4Na_2Nb_{10}O_{20}$ and combinations thereof are combined with $TiO_2$ powder and sintered in a reducing environment at a temperature in a range from about 900° C. to about 1450° C., or from about 1200° C. to about 1375° C., to produce electrically conductive phases within the sintered semiconductor powder formulation.

6. The thick film heating device according to claim 1, wherein said conductive nanorods or conductive nanowires, or both, are comprised of one or more of Ag, Cu, Ni, Au, Al, Fe, Pd, Pt, Si, $TiO_2$, ZnO, $RuO_2$, indium-tin oxide (ITO), and Cu—Ni nanorods and/or nanowires with a core-shell structure comprised of a copper nanowire or nanorod onto which one or more atomic layers of nickel has been deposited, and wherein a mass fraction of the Cu—Ni nanorods to the doped semiconductor particles in the semiconductor powder ranges from about 10 wt. % to about 60 wt. %, or
   about 25 wt. % to about 55 wt. %, or
   about 40 wt. % to about 50 wt. %.

7. The thick film heating device according to claim 1, wherein the conductive nanowires and/or conductive nanorods are carbon nanotubes doped to reduce the intrinsic band gap of the carbon nanotube; or
   single wall carbon nanotubes or multi-wall carbon nanotubes having a mass fraction to the doped semiconductor particles in a range from about 1.5 wt. % to about 30 wt. %.

8. The thick film heating device according to claim 1, wherein the conductive nanowires and/or conductive nanorods have a length ranging from about 1 μm to about 50 μm, or
   about 2 μm to about 20 μm, or
   about 5 μm to 10 about μm; and
   have an aspect ratio ranging from about 1 to about 500, or
   about 2 to 200, or
   about 3 to 100.

9. A sol-gel paste, comprising:
   a liquid sol-gel having disbursed throughout
      i) doped semiconductor particles of at least one type, said doped semiconductor particles of at least one type having either a perovskite crystal structure or a tungsten-bronze crystal structure and exhibiting a positive thermal coefficient of resistivity above a threshold switching temperature, and
      ii) conductive nanowires or conductive nanorods, or both, to facilitate electrical conduction between said at least one type of doped semiconductive particles.

10. The sol-gel paste according to claim 9, further comprising said doped semiconductor particles of at least one type having conductive particles bound to an outer surface of said one or more types of doped semiconductor particles.

11. The sol-gel paste according to claim 9, wherein said doped semiconductor particles of at least one type have a perovskite crystal structure and are selected from the group consisting of $BaTiO_3$, $KNbO_3$, $SrTiO_3$, $CaTeO_3$, $SrTeO_3$, $BaTeO_3$, $SrNbO_3$, $KNaNbO_3$ and combinations thereof.

12. The sol-gel paste according to claim 9, wherein said doped semiconductor particles of at least one type have a tungsten-bronze crystal structure and are selected from the group consisting of $BaNb_2O_6$, $Sr_2KNb_5O_{15}$, $Ba_4Na_2Nb_{10}O_{20}$ and combinations thereof.

13. The sol-gel paste according to claim 12, wherein said doped semiconductor particles of any one of $BaNb_2O_6$, $Sr_2KNb_5O_{15}$, $Ba_4Na_2Nb_{10}O_{20}$ and combinations thereof are combined with $TiO_2$ powder and sintered in a reducing environment at a temperature in a range from about 900° C. to about 1450° C., or from about 1200° C. to about 1375° C., to produce electrically conductive phases within the sintered semiconductor powder formulation.

14. The sol-gel paste according to claim 9, wherein said conductive nanorods or conductive nanowires, or both, are comprised of one or more of Ag, Cu, Ni, Au, Al, Fe, Pd, Pt, Si, $TiO_2$, ZnO, $RuO_2$, indium-tin oxide (ITO), or Cu—Ni nanorods and/or nanowires with a core-shell structure comprised of a copper nanowire or nanorod onto which one or more atomic layers of nickel has been deposited, and wherein a mass fraction of the Cu—Ni nanorods to the doped semiconductor particles in the semiconductor powder ranges from about 10 wt. % to about 60 wt. %, or
   about 25 wt. % to about 55 wt. %, or
   about 40 wt. % to about 50 wt. %; and said conductive nanorods and/or conductive nanowires having a length ranging from about 1 μm to about 50 μm, or about 2 μm to about 20 μm, or about 5 μm to 10 about μm; and have an aspect ratio ranging from about 1 to about 500, or about 2 to 200, or about 3 to 100.

15. The sol-gel paste according to claim 9, wherein the conductive nanowires and/or conductive nanorods are carbon nanotubes doped to reduce the intrinsic band gap of the carbon nanotube; or single wall carbon nanotubes or multi-wall carbon nanotubes having a mass fraction to the doped semiconductor particles in a range from about 1.5 wt. % to about 30 wt. %.

* * * * *